Jan. 15, 1929.  1,699,087
J. L. WOODMANSEE ET AL
ROTATING COLLAR
Filed Aug. 17, 1927
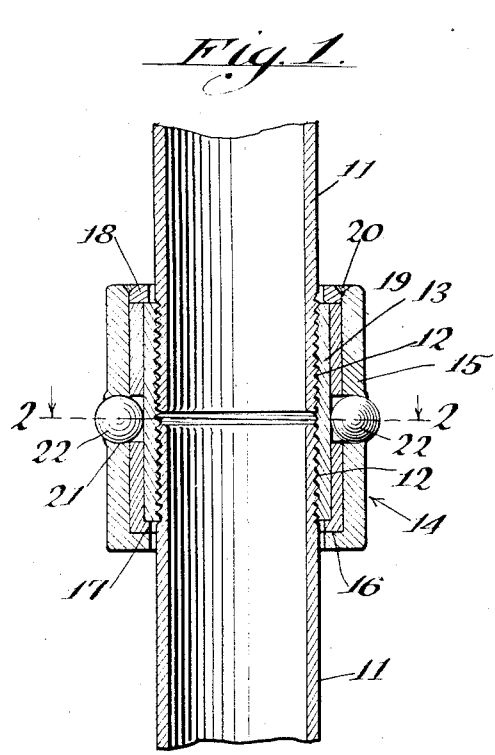
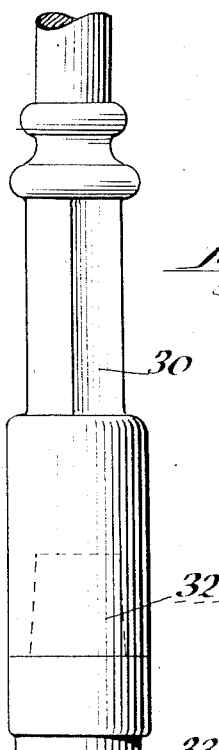
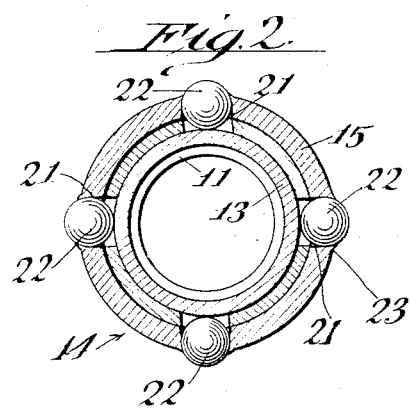
Inventors
John L. Woodmansee
Hollis D. Woodmansee
by Hazard and Miller
Attorneys Patented Jan. 15, 1929.

1,699,087

UNITED STATES PATENT OFFICE.

JOHN L. WOODMANSEE, OF BUENA PARK, AND HOLLIS D. WOODMANSEE, OF VENTURA, CALIFORNIA.

ROTATING COLLAR.

Application filed August 17, 1927. Serial No. 213,562.

Our invention is a rotating collar to be used in well operations preventing friction rubbing against a well casing or the like.

An object of our invention is the construction of a rotating collar which may be attached to a coupling such as a coupling of a drill pipe or to a connecting element in sucker rods for pumping deep wells, preventing a friction of the drill pipe or the sucker rod against the side of the well casing or of the oil pipe.

Another object of our invention is the construction of a rotating collar in which a series of balls may be mounted, these balls having a bearing against a ring and retained in place by the collar, the whole arrangement being connected and welded, forming a unit, the balls however, being free to rotate.

Our invention is illustrated in the accompanying drawings, in which:

Figure 1 is a vertical section through our rotating collar when connected to a drill pipe.

Fig. 2 is a horizontal section on the line 2—2 of Figure 1 in the direction of the arrows.

Fig. 3 is a side elevation partly broken away, of a modification of our invention as used with sucker rods or the like.

Dealing with the construction of Figures 1 and 2, sections of a drill pipe are indicated by the numeral 11 having threads 12 for connection with an internally threaded coupling sleeve 13, this being the ordinary type of connection. Outside of the sleeve 13 the collar 14 is applied. This collar has a cylindrical part 15 and an inturned flange 16 at the bottom, the flange engaging the lower edge 17 of the sleeve 13. At the upper end a ring 18 is fitted in a recess 19 formed in the sleeve and overlaps the upper edge of the sleeve 13. A weld 20 is then formed connecting the ring 18 and the outer part of the collar 14 at the top.

The collar is provided with a plurality of openings or perforations 21, and in each of these is fitted a ball 22. The outer portion of the sleeve 13 is then peened, forming a retainer for each of the balls. If desired, metal may be built up by welding adjacent the balls and then peened or hammered so as to secure the balls in position.

The manner of functioning and operation of our collar, of Figures 1 and 2 is as follows: It will be seen that the balls are supported in the openings or perforations in the collar in such a manner that they can not fall out, and that they have a bearing on the sleeve 13. The fitting is such as to allow the balls to have a slight rotating and sliding motion in reference to the sleeve 13 and the sides of the openings 21 in which they are fitted, and also the peened or hammered-in part 23 of the collar. Therefore, when the balls contact with a well casing or other piping in a well, the balls have a slight rotating movement and protect the sleeve from wear against the casing.

In the construction illustrated in Figure 3, the sections of a sucker rod are designated by the numeral 30. These sections are normally connected by one having a pin 31 thereon and the other having a box structure 32 to allow inter-fitting by screwing the parts of the sucker rod together. When it is desired to use our collar, a sub 33 is fitted between the sections of the sucker rod, and this sub preferably has an enlargement 34, this sleeve being preferably a driving fit. A collar 38 is fitted over the sleeve and has an inwardly turned flange 39 on its lower edge engaging the lower surface of the sleeve. A ring 40 is fitted on top of the sleeve 35 and overlaps slightly the upper edge of the enlargement 35, and is welded to the upper part of the collar as indicated by the numeral 41.

The collar is provided with openings or perforations 42 in which are fitted balls 43, the metal of the collar being peened partly over the balls as indicated by the numeral 44. There is sufficient play so that the balls may have a slight working action on the sleeve 35 in the opening or perforation in the collar 38, and also in the peened section 34.

The manner of operation and functioning of the collar of Figure 3 is substantially as follows. If the sucker rod is reciprocated inside of an oil pipe, the balls are adapted to contact with the inner surface of the pipe, such balls having a slight rolling action to reduce the friction of the contact, especially as the sucker rod reciprocates. This prevents actual contact of the jointing sections of the sucker rod and prevents the sub from contacting with the oil pipe or the like.

The above two illustrations indicate the manner in which our rotating collar may be attached to various equipment used in deep well work such as in oil wells, and illustrate the use as attached to a rotating drill pipe as shown in Figures 1 and 2, and of a reciprocating device such as a sucker rod as shown in Figure 3. The principal advantage is substantially the same—that the balls are free to rotate, having however, a rubbing contact on the internal sleeves and rubbing against the sides of the hole in which they are inserted. Also, our invention in detail comprises the simple manner of the assembly.

Various changes may be made in the principles of our invention without departing from the spirit thereof, as set forth in the description, drawings and claims.

We claim:

1. In the art described, the combination of a structure used in well operations having a sleeve secured thereto, a collar having a flange at one end, the flange engaging the end of the sleeve, means to secure the other end of the collar to the sleeve, the collar having a series of openings with balls therein, the said balls bearing on the sleeve, and means to retain the balls in the collar.

2. In the art described, the combination of a structure used in well operations having a sleeve mounted thereon, a collar on the sleeve, a ring bearing against one end of the sleeve and a welded joint connecting the ring and the collar, the collar having a plurality of openings with balls therein, and means to retain the balls in the collar, said balls bearing on the sleeve.

3. In the art described, a structure used in well operations having a sleeve mounted thereon, a collar fitted on the sleeve and having an inturned flange engaging one end of the sleeve, a ring at the other end of the collar engaging the other end of the sleeve, a welded joint between the ring and the collar, the collar having a plurality of openings with balls therein, the collar having the metal adjacent the openings peened partly over the balls, the balls bearing on the said sleeve.

4. In the art described, a drill pipe having a sleeve threaded on the joint of two sections of the pipe, a collar fitted on the outside of the sleeve, a ring engaging one end of the sleeve and the collar and having a welded joint with the collar, the collar having a series of openings with balls therein, the balls bearing on the sleeve, the metal of the collar adjacent the openings being peened to retain the balls in position.

5. In the art described, a drill pipe having a pair of sections with a sleeve forming an external joint, a collar fitted on the sleeve and having an inturned flange engaging one end of the sleeve, a ring engaging the other end of the sleeve and the collar adjacent the other end, a welded joint between the ring and the collar, the collar having a plurality of openings with balls therein, the balls resting on the sleeve, the metal of the collar being peened adjacent the openings to retain the balls in position.

6. In the art described, a sucker rod having a plurality of sections with a sub therebetween, a sleeve secured to the sub, a collar secured to the sleeve, a ring at one end of the sleeve, a welded joint between the ring and the collar, the collar having a plurality of openings with balls therein, the balls resting on the sleeve and the metal of the collar adjacent the openings being peened to retain the balls in position.

In testimony whereof we have signed our names to this specification.

JOHN L. WOODMANSEE.
HOLLIS D. WOODMANSEE.